United States Patent
Soni et al.

(10) Patent No.: US 10,776,433 B2
(45) Date of Patent: Sep. 15, 2020

(54) USER PROFILE EXPANSION FOR PERSONALIZATION AND RECOMMENDATION

(71) Applicant: Oath Inc., New York, NY (US)

(72) Inventors: Akshay Soni, San Jose, CA (US); Troy Chevalier, San Mateo, CA (US); Yashar Mehdad, San Jose, CA (US)

(73) Assignee: Oath Inc., New York, NY (US)

( * ) Notice: Subject to any disclaimer, the term of this patent is extended or adjusted under 35 U.S.C. 154(b) by 211 days.

(21) Appl. No.: 15/280,976

(22) Filed: Sep. 29, 2016

(65) Prior Publication Data

US 2018/0089311 A1 Mar. 29, 2018

(51) Int. Cl.
- G06F 17/30 (2006.01)
- G06F 16/9535 (2019.01)
- G06F 16/335 (2019.01)

(52) U.S. Cl.
CPC ........ *G06F 16/9535* (2019.01); *G06F 16/335* (2019.01)

(58) Field of Classification Search
CPC ......... G06F 17/30696; G06F 17/30011; G06F 17/30525; G06F 17/30554; G06F 17/30864; G06F 17/3053; G06F 17/30887; G06F 16/93; G06F 16/248; G06F 16/367; G06F 16/24578; G06F 16/951; G06F 16/9024; G06F 16/954
See application file for complete search history.

(56) References Cited

U.S. PATENT DOCUMENTS

| | | | |
|---|---|---|---|
| 7,769,740 B2* | 8/2010 | Martinez | G06F 16/951 707/706 |
| 8,484,203 B1* | 7/2013 | Clancy | H04N 21/252 707/723 |
| 8,725,739 B2* | 5/2014 | Liang | G06F 16/3323 707/740 |
| 2007/0156677 A1* | 7/2007 | Szabo | G06F 16/2457 |
| 2008/0085583 A1* | 4/2008 | Park | H01L 21/02181 438/261 |
| 2009/0164450 A1* | 6/2009 | Martinez | G06F 16/951 |
| 2010/0039381 A1* | 2/2010 | Cretella, Jr. | G06F 3/0317 345/158 |

(Continued)

*Primary Examiner* — Daniel A Kuddus
(74) *Attorney, Agent, or Firm* — Cooper Legal Group, LLC

(57) ABSTRACT

Software for a website hosting a content-aggregation service generates a first representation of interests for a user. The first representation includes a plurality of entities including pivot entities and extended entities, where the extended entities result from a nearest-neighbor search of word embeddings. Each of the extended entities is associated with a nearness score that is weighted using a distance of the extended entity from one of the pivot entities. For each of a plurality of articles ingested by the content-aggregation service, the software generates a second representation that associates an aboutness score with each of the plurality of entities. The software uses the first representation, a similarity measure, and the second representations to create rankings of the plurality of articles. The software receives a request for access to the content-aggregation service from the user and serves the user a content stream based at least in part on the rankings.

20 Claims, 7 Drawing Sheets

(56) References Cited

U.S. PATENT DOCUMENTS

| | | | |
|---|---|---|---|
| 2012/0109966 A1* | 5/2012 | Liang | G06F 16/338 |
| | | | 707/740 |
| 2012/0287278 A1* | 11/2012 | Danis | G08G 1/0175 |
| | | | 348/148 |
| 2012/0297278 A1* | 11/2012 | Gattani | G06F 16/367 |
| | | | 715/205 |
| 2014/0059185 A1* | 2/2014 | Siripurapu | G06F 16/951 |
| | | | 709/219 |
| 2015/0089409 A1* | 3/2015 | Asseily | G06Q 50/01 |
| | | | 715/765 |
| 2016/0154856 A1* | 6/2016 | Olof-Ors | G06F 16/24578 |
| | | | 707/728 |

\* cited by examiner

Figure 4

1. $\mathbf{w_i} = \begin{bmatrix} w_{i1}, ..., w_{ij}, .. w_{iM} \end{bmatrix}^T$ 2. $\mathbf{d_i} = \begin{bmatrix} d_{i1}, ..., d_{ij}, .. d_{iM} \end{bmatrix}^T$ 3. $\text{similarity} = \begin{bmatrix} w_{i1}^T d_{i1} \\ \vdots \\ w_{ij}^T d_{ij} \\ \vdots \\ w_{iM}^T d_{iM} \end{bmatrix}$

Figure 7

USER PROFILE EXPANSION FOR PERSONALIZATION AND RECOMMENDATION

BACKGROUND

Content-aggregation websites, including social-networking websites, often display content to a user using graphical user interface (GUI) functionality called a "content stream". Such websites determine inclusion or prominence of an item (e.g., an article) in the content stream based at least in part on the a personalized user-interest profile which records the user's explicit (e.g., expressly identified interests) and implicit relevance feedback (e.g., clicks) as to previous items of content presented in the content stream.

However, the personalized user-interest profile for an infrequent user might be nearly empty. Consequently research into such profiles remains an active area of research and experimentation.

SUMMARY

In an example embodiment, a processor-executed method is described. According to the method, software for a website hosting a content-aggregation service generates a first representation of interests for an infrequent user of a content-aggregation service. The first representation includes a plurality of entities including (1) pivot entities and (2) extended entities resulting from a nearest-neighbor search of word embeddings. Each of the extended entities is associated with a nearness score that is weighted using a distance of the extended entity from one of the pivot entities. For each of a plurality of ingested articles received by the content-aggregation service, the software generates a second representation that associates an aboutness score with each of the plurality of entities. The software uses the first representation, a similarity measure, and the second representations to create rankings of the plurality of ingested articles. The software receives a request for access to the content-aggregation service from the user. Then the software serves the user a content stream based at least in part on the rankings.

In another example embodiment, an apparatus is described, namely, computer-readable media which persistently store a program for a website hosting a content-aggregation service. The program generates a first representation of interests for an infrequent user of a content-aggregation service. The first representation includes a plurality of entities including (1) pivot entities and (2) extended entities resulting from a nearest-neighbor search of word embeddings. Each of the extended entities is associated with a nearness score that is weighted using a distance of the extended entity from one of the pivot entities. For each of a plurality of ingested articles received by the content-aggregation service, the program generates a second representation that associates an aboutness score with each of the plurality of entities. The program uses the first representation, a similarity measure, and the second representations to create rankings of the plurality of ingested articles. The program receives a request for access to the content-aggregation service from the user. Then the program serves the user a content stream based at least in part on the rankings.

Another example embodiment also involves a processor-executed method. According to the method, software for a website hosting a content-aggregation service generates a first representation of interests for an infrequent user of a content-aggregation service. The first representation includes a plurality of entities including (1) pivot entities and (2) extended entities resulting from a nearest-neighbor search using cosine similarity of word embeddings that were generated using word2vec functionality nearest-neighbor search. Each of the extended entities is associated with a nearness score that is weighted using a distance of the extended entity from one of the pivot entities. For each of a plurality of ingested articles received by the content-aggregation service, the software generates a second representation that associates an aboutness score with each of the plurality of entities. The software uses the first representation, a similarity measure, and the second representations to create rankings of the plurality of ingested articles. The software receives a request for access to the content-aggregation service from the user. Then the software serves the user a content stream based at least in part on the rankings.

BRIEF DESCRIPTION OF THE DRAWINGS

FIG. 4 shows a content stream presented by a content-aggregation website, in accordance with an example embodiment.

FIG. 7 shows a similarity calculation using an interest vector for a user and an entity vector for an article, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
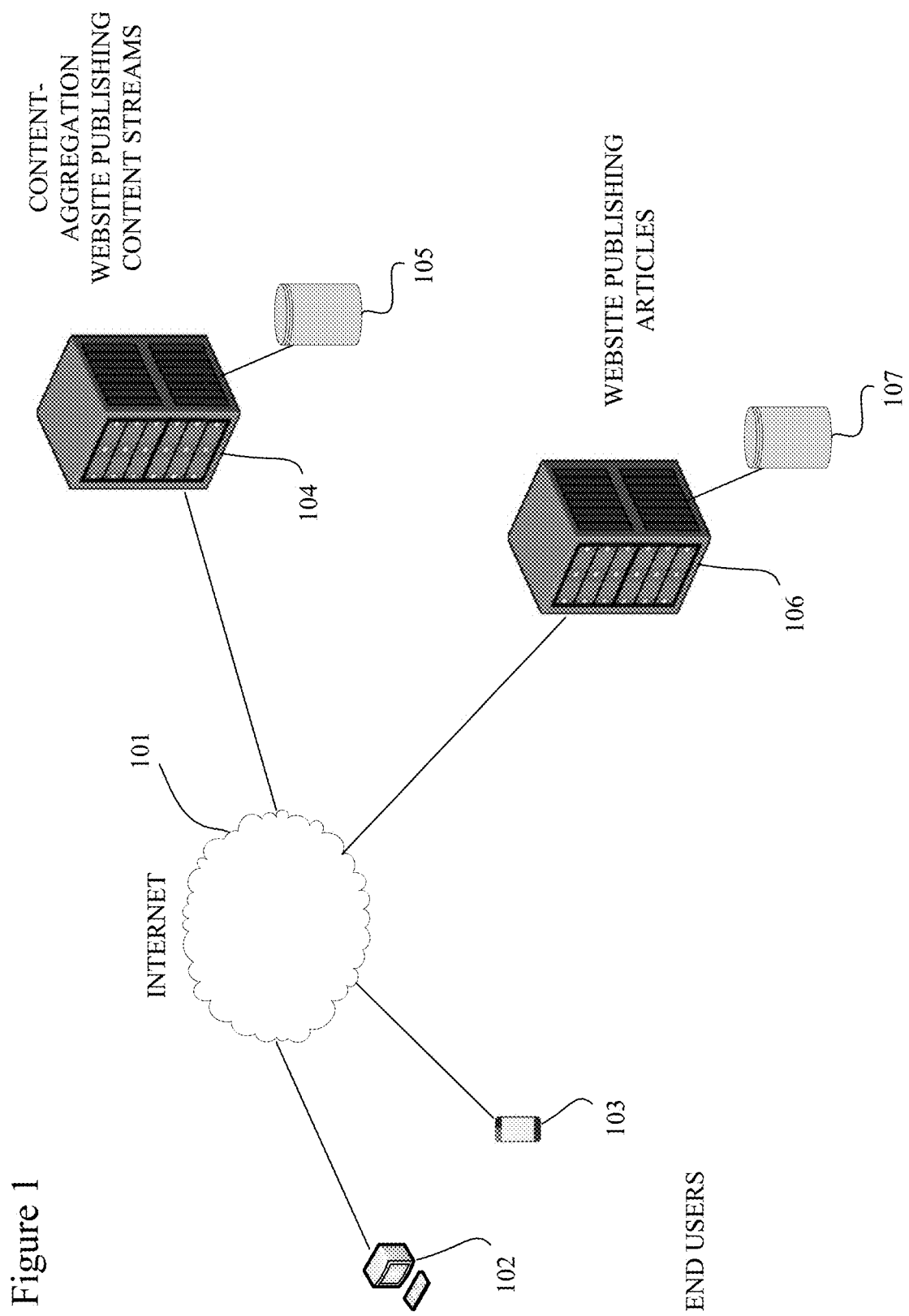
FIG. 1 is a network diagram showing a content-aggregation website, in accordance with an example embodiment.

FIG. 1 is a network diagram showing a website hosting a content-aggregation service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting a content-aggregation service that publishes a content stream and a website 106 hosting a publishing service (e.g., the website for the New York Times). In an example embodiment, website 104 might be a website such as Yahoo! News or Google News, which ingests content from the Internet through "push" technology (e.g., a subscription to a web feed such as an RSS feed) and/or "pull" technology (e.g., web crawling), including articles (or Uniform Resource Locators (URLs) for articles) from website 106.

Alternatively, in an example embodiment, website 104 might host an online social network such as Facebook or Twitter. As used here and elsewhere in this disclosure, the term "online social network" is to be broadly interpreted to include, for example, any online service, including a social-media service, that allows its users to, among other things, (a) selectively access (e.g., according to a friend list, contact list, buddy list, social graph, interest graph, or other control list) content (e.g., text including web links, images, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including web links, images, videos, animations, audio recordings, games and other software, etc.) to each other's newsfeeds (e.g., content/activity streams such as Facebook's News Feed, Twitter's Timeline, Google Plus's Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

And as used in this disclosure, the term "content-aggregation service" is to be broadly interpreted to include any online service, including a social-media service, that allows its users to, among other things, access and/or annotate (e.g., comment on) content (e.g., text including web links, images, videos, animations, audio recordings, games and other software, etc.) aggregated/ingested by the online service (e.g., using its own curators and/or its own algorithms) and/or its users and presented in a "wall" view or "stream" view. It will be appreciated that a website hosting a content-aggregation service might have social features based on a friend list, contact list, buddy list, social graph, interest graph, distribution list, or other control list that is accessed over the network from a separate website hosting an online social network through an application programming interface (API) exposed by the separate website. Thus, for example, Yahoo! News might identify the content items in its newsfeed (e.g., as displayed on the front page of Yahoo! News) that have been viewed/read by a user's friends, as listed on a Facebook friend list that the user has authorized Yahoo! News to access.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.) and distributed-computing and/or cloud software such as Map-Reduce, Google File System, Hadoop, Hadoop YARN, Hadoop File System, Pig, Hive, Dremel, CloudBase, etc. The servers in website 104 might be connected to persistent storage 105 and the servers in website 106 might be connected to persistent storage 107. Persistent storages 105 and 107 might include flash memory, a redundant array of independent disks (RAID), and/or a storage area network (SAN), in an example embodiment. In an alternative example embodiment, the servers for websites 104 and 106 and/or the persistent storage in persistent storages 105 and 107 might be hosted wholly or partially in a public and/or private cloud, e.g., where the cloud resources serve as a platform-as-a-service (PaaS) or an infrastructure-as-a-service (IaaS).

Persistent storages 105 and 107 might be used to store content (e.g., text including web links, images, videos, animations, audio recordings, games and other software, etc.) and/or its related data. Additionally, persistent storage 105 might be used to store data related to users and their social contacts (e.g., Facebook friends), as well as software including algorithms and other processes, as described in detail below, for presenting the content (including related articles) to users in a content stream. In an example embodiment, the content stream might be ordered from top to bottom (a) in reverse chronology (e.g., latest in time on top), or (b) according to scores, e.g. interestingness scores. In an example embodiment, some of the content (and/or its related data) stored in persistent storages 105 and 107 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105 and 107.

Personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, a global positioning system (GPS), or other location-identifying capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104 and 106. Alternatively, users of personal computer 102 and/or mobile device 103 might use application programs (or apps, including hybrid apps that display HTML content) to access content presented by websites 104 and 106.

Figure 2:
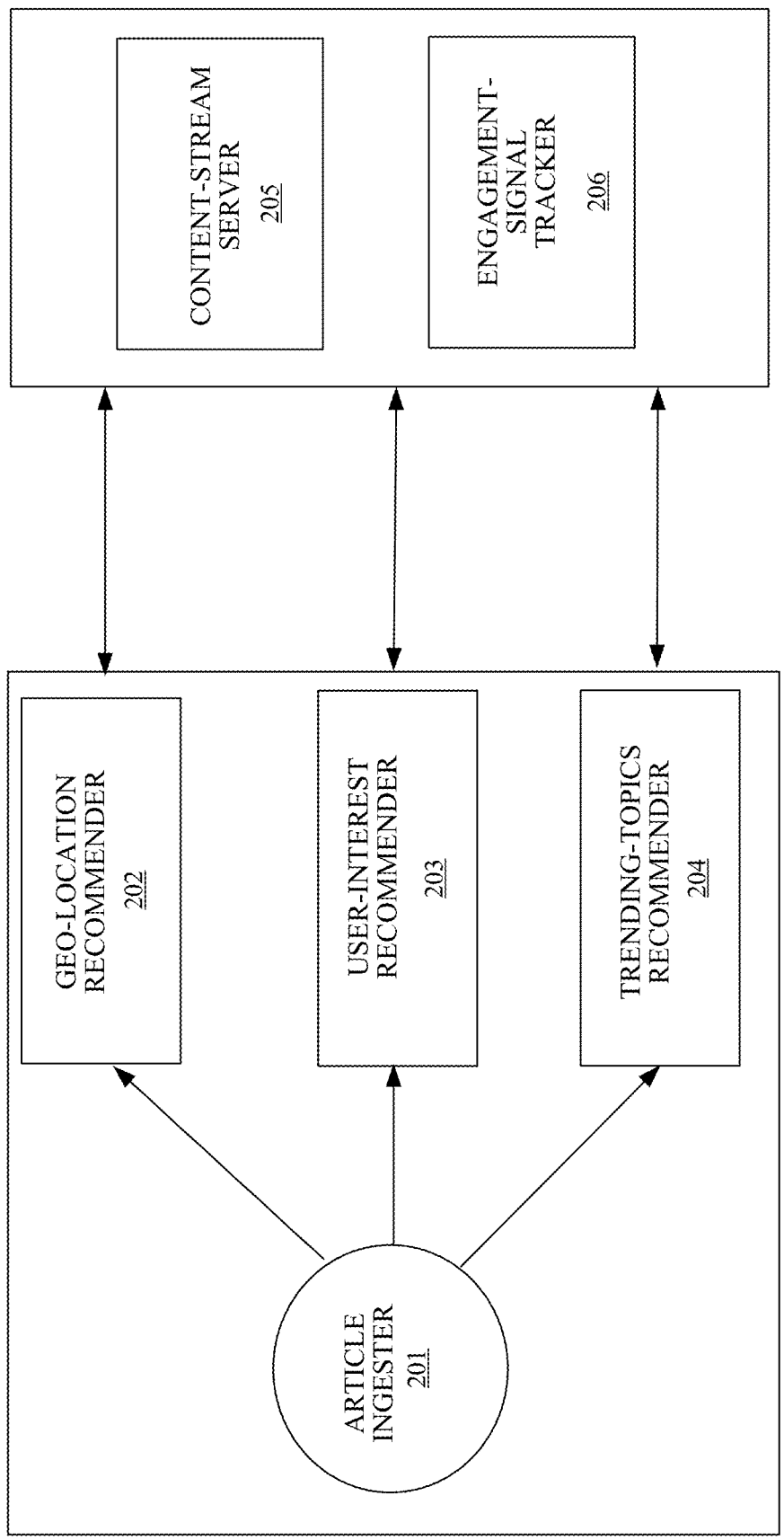
FIG. 2 shows modules at a content-aggregation website, in accordance with an example embodiment.

FIG. 2 shows modules at a content-aggregation website, according to an example embodiment. In an example embodiment, the modules shown in this figure might be included in software running on servers at website 104 (e.g., Yahoo! News, Google News, Facebook, Twitter, etc.) using persistent storage 105. As shown in the figure, article ingester 201 might obtain articles over the Internet from publishing services (e.g., website 106) using the "push" and/or "pull" technologies described above. Article ingester 201 might then forward the articles to three different recommender modules: geo-location recommender 202, user-interest recommender 203, and trending-topics recommender 204. In an example embodiment, the geo-location recommender 202 might use a baseline interest profile that is based on geographic location and that is made discriminative through a sparse-polarity approach as described in co-owned U.S. patent application Ser. No. 15/265,777, entitled "Baseline Interest Profile for Recommendations Using a Geographic Location", filed on Sep. 14, 2016, which is incorporated herein by reference. In an example embodiment, the user-interest recommender 203 might recommend articles for inclusion in the content stream of a user based on a personalized user-interest profile for the user, e.g., which records the user's expressed interests (explicit relevance feedback) and the user's past engagement signals (implied relevance feedback) with other articles presented to the user, as described below. And in an example embodiment, the trending-topics recommender 204 might recommend articles to the user based on recent real-time or near real-time engagement signals (e.g., clicks, mouse-overs, dwell time, skips, etc.) received from other users of the content-aggregation service. It will be appreciated that a "skip" might occur when a user clicks on an article prominently presented (e.g., toward the top) in a stream and then clicks on an article less prominently presented (e.g., toward the bottom) in the same stream. Any articles presented in the stream between the two clicked articles are "skipped".

The articles recommended by the three recommender systems might then be served to the user by a content-stream server 205. And in an example embodiment, engagement signal tracker 206 might then monitor the served articles for engagement signals from the user and report those signals back to each of the three recommender modules for incorporation into the module's recommender, e.g., in real-time or near real-time.

Figure 3:
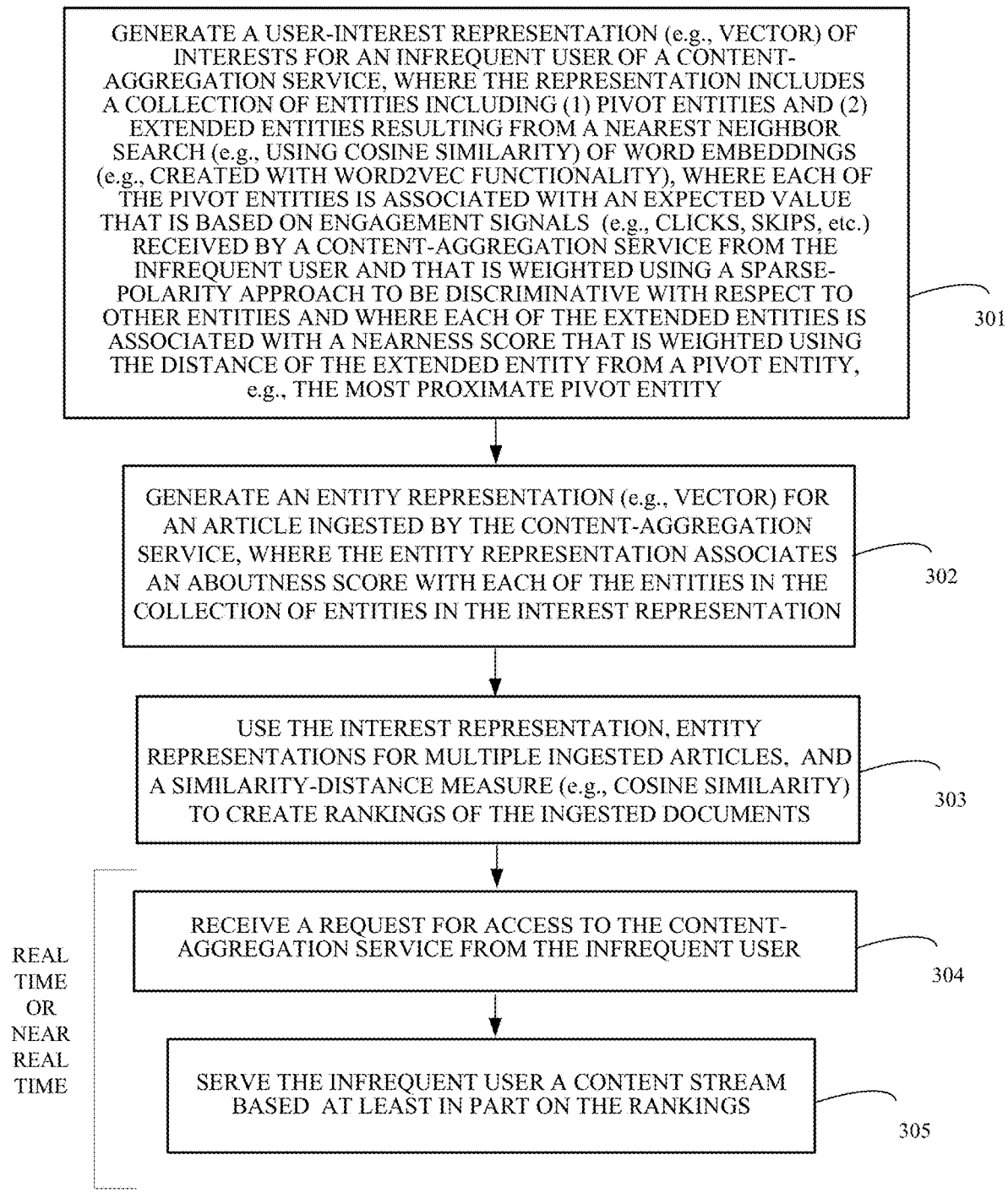
FIG. 3 is a flowchart diagram of a process that uses user-interest profile expansion, in accordance with an example embodiment.

FIG. 3 is a flowchart diagram of a process using user-interest profile expansion, in accordance with an example embodiment. In an example embodiment, the operations shown in this figure might be performed by software running on servers at website 104 (e.g., Yahoo! News, Google News, Facebook, Twitter, etc.) using persistent storage 105. In an alternative example embodiment, some of the operations shown in this figure might be performed by software (e.g., a client application including, for example, a webpage with embedded JavaScript or ActionScript) running on a client device (e.g., personal computer 102 or mobile device 103). It will be appreciated that these operations supplement the operations depicted in FIG. 2, e.g., all or some of the operations might be performed by user-interest recommender 203.

As depicted in FIG. 3, the software (e.g., the software running on servers at website 104) generates a user-interest representation (e.g., vector) of interests for an infrequent user of a content-aggregation website, in operation 301. The user-interest representation is an interest profile that includes a collection of entities that includes (1) pivot entities and (2) extended entities resulting from a nearest neighbor search (e.g., using cosine similarity) of word embeddings (e.g., created with word2vec functionality). In an example embodiment, each of the pivot entities is associated with an expected value (which might be normalized) that is: (A) based on engagement signals (e.g., clicks, mouse-overs, dwell time, skips, etc.) received by a content-aggregation service from the infrequent user; and/or (B) that is weighted using a sparse-polarity approach to be discriminative with respect to other entities. Also, in an example embodiment, each of the extended entities might be associated with a nearness score that is weighted using a distance of the extended entity from one of the pivot entities, e.g., the most proximate pivot entity.

In operation 302, the software generates an entity representation (e.g., vector) for an article ingested by the content-aggregation service. In an example embodiment, the entity representation associates a document-aboutness score, which might be normalized, with each of the entities in the collection of entities in the user-interest representation. In an example embodiment, "document aboutness" is defined in terms of its salient entities as described in the article by Gamon et al., "Understanding Document Aboutness Step One: Identifying Salient Entities" (Microsoft Corporation, 2013), which is incorporated herein by reference. In operation 303, the software uses the user-interest representation, entity representations for multiple ingested articles, and a similarity-distance measure (e.g., cosine similarity) to create rankings of the ingested documents. Then in operation 304, the software receives a request for access to the content-aggregation service from the infrequent user. And in operation 305, the software serves the infrequent user a content stream based at least in part on the rankings (e.g., shown in decreasing order in the content stream).

It will be appreciated that the process described above uses content-based filtering rather than collaborative filtering, as those terms are used in the area of recommender systems. Thus, an advantage of the process described above is that it requires no collaborative exploration of infrequent users.

In an example embodiment, the software might use a sparse-polarity approach to weight the expected values in the user-interest representation, in operation 301. The object of such an approach is to make the interest representation sparse by including in it only those entities (or features) that are specific to a user and not those that are popular among all users. In this regard, see co-owned U.S. Published Patent Application No. 2015/0127662 by Yi et al., which is incorporated herein by reference. A formal description of such an approach in the context of operation 301 is provided below.

First, a background probability that an entity j will be engaged with by a user i (e.g., an infrequent user) is calculated using a formula similar to the following, where j is an entity, i is a user, and n is a number of engagements (e.g., as determined from logs kept by the content-aggregation service):

$$P_{+j} = \frac{\sum_i (n_{ij})}{\sum_{ij} (n_{ij})}$$

This background probability can be interpreted as the probability someone in the general population will interact with item j. This background probability is then used to calculate an expected value for the number of engagements with an entity j by user i using a formula similar to the following:

$$e_{ij} = P_{+j} \sum_j (n_{ij})$$

This expected value can be interpreted as the expected number of engagements with entity j by user i, assuming user i does not deviate from the general population. This expected value is then used to calculate an affinity score for user i for the entity j, using a formula similar to the following, where k is a chi-squared smoothing parameter:

$$\lambda_{ij} = \frac{n_{ij} + k}{e_{ij} + k}$$

Ignoring the smoothing parameter, it can be seen that the affinity score represents a comparison between the actual number of engagements with entity j by user i and the expected number of such engagements based on the probability for the general population.

This affinity score is then used to remove entities which have affinity scores that are not significantly higher than that of the general population. More specifically, the affinity score for user i for the entity j is used to calculate a z-statistic using a formula similar to the following, where the log-normalized affinity score is divided by the standard deviation represented by the lowercase sigma:

$$z = \frac{|\log(\lambda_{ij})|}{\sigma}$$

Then the z-statistic is used to determine a final affinity score using a formula similar to the following:

$$\text{score} = (z>1)? \log(\lambda_{ij}); 0$$

From this formula, it can be seen that if z is greater than one, then the final affinity score is the log of the affinity score, whereas if z is not greater than one, the final affinity score is zero, which effectively eliminates the entity j from the user-interest representation for user i.

In an example embodiment, the final affinity score might be further weighted using a Laplace smoothing parameter in order to give greater importance to entities that were engaged with (e.g., clicked) more than skipped.

It will be appreciated that the above calculations as to final affinity score might be performed in parallel for every user i, e.g., using Map-Reduce functionality.

In operation 301, the software generates a user-interest representation that might be a vector and, in operation 302, the software generates an entity representation that might also be a vector. It will be appreciated that the use of vectors as representations determines to some extent the similarity-distance measure in operation 303, e.g., cosine similarity (which might reduce to an inner-product vector calculation when the values in each vector are normalized). In another example embodiment, the software might generate a user-interest representation and an entity representation that are sets (or "bags of words") and the software might use a corresponding similarity-distance measure, e.g., Jaccard similarity. In yet another example embodiment, the software might use some other similarity-distance measure and corresponding representations, e.g., a Euclidean similarity-distance measure or a City Block similarity-distance measure.

Also, in operation 301, the user-interest representation includes a collection of entities which includes both pivot entities and extended entities. In an example embodiment, the pivot entities might be labels derived from a corpus of documents (e.g., titles of articles in Wikipedia) or from a content taxonomy. In this regard, Yahoo! maintains a hierarchical content taxonomy, called the Yahoo! Content Taxonomy (YCT), whose parent and child nodes are content categories. In such an example embodiment, the pivot entities in the user-interest representation might be derived from YCT, where each pivot entity is associated with a membership score that is analogous to a document-aboutness score. And each entity representation might also include entities derived from YCT, here each entity is associated with a membership score. In an example embodiment, the pivot entities in the user-interest representation and the entities in the entity representation might include both labels derived from a corpus of documents (e.g., titles of Wikipedia articles) and labels derived from a content taxonomy (e.g., YCT).

As indicated in FIG. 3, operations 304 and 305 might be performed in real-time or near real-time, e.g., using streaming functionality. In an example embodiment, that streaming functionality might be a distributed streaming platform that is integrated with a distributed computing framework such as Hadoop YARN. It will be appreciated that Hadoop YARN is in the Hadoop family of software but includes functionality for handling distributed computations that are not structured as batch jobs for Map-Reduce processing, including distributed computations that are streaming. Also, in an example embodiment, the distributed computing framework might be supported by distributed storage, which might be Hadoop Distributed File System (HDFS), in an example embodiment. And the distributed computing framework and distributed storage might run on a networked cluster of servers (e.g., commodity servers) or other hardware computation units (e.g., the hardware computation units emanating from Facebook's Open Compute Project).

Also, in an example embodiment, the user-interest representation (or user-interest profile) might be generated offline by the software using logs that record the engagement signals of the content-aggregation service's users with the entities in the articles served by the content-aggregation service over a period of time (e.g., six months). In the same example embodiment, the user-interest representation might be updated by the software on a periodic basis (e.g., weekly) to reflect new engagement signals received during a period (e.g., a week). In another example embodiment, the user-interest representation might be updated in real-time or near real-time, e.g., using the streaming functionality described above.

FIG. 4 shows a content stream presented by a content-aggregation website, in accordance with an example embodiment. In an example embodiment, the content stream might be generated by the content stream server 205 in FIG. 2. As depicted in FIG. 4, content stream 401 includes two full articles (402 and 403) arranged vertically in order of prominence from top to bottom in accordance with recommender rankings (e.g., with the highest-ranking article at the top and the lowest-ranking article at the bottom). Content stream 401 also includes four thumbnail articles (404, 405, 406, and 407) arranged horizontally and an ad 408 labeled "Sponsored". Displayed outside the content stream 401 are trending topics 409, which might be generated by trending-topics recommender 204 in FIG. 2. In an example scenario, trending-topics recommender 204 might reflect short-term interests of users, whereas the geo-location recommender 202 and the user-interest recommender 203 reflect long-term interests of users.

In an example embodiment, one or more of the full articles and/or one or more of thumbnail articles might have been recommended using the process described in FIG. 3, e.g., as performed by the user-interest recommender 203 in FIG. 2. Additionally, in the same example embodiment, one or more of the full articles and/or one or more of thumbnail articles might have been recommended by the geo-location recommender 202 in FIG. 2. In an example scenario, the geo-location recommender 202 might be used to show a user entities that extend beyond those recorded in the user's personalized user-interest profile, e.g., as part of "explore-exploit" presentation to maintain the user's interest. In this regard, see Argawal et al., *Explore/Exploit Schemes for Web Content Optimization*, Ninth IEEE International Conference on Data Mining 2009 (ICDM '09) (hereinafter "Explore/Exploit Schemes"), which is incorporated herein by reference.

Figure 5:
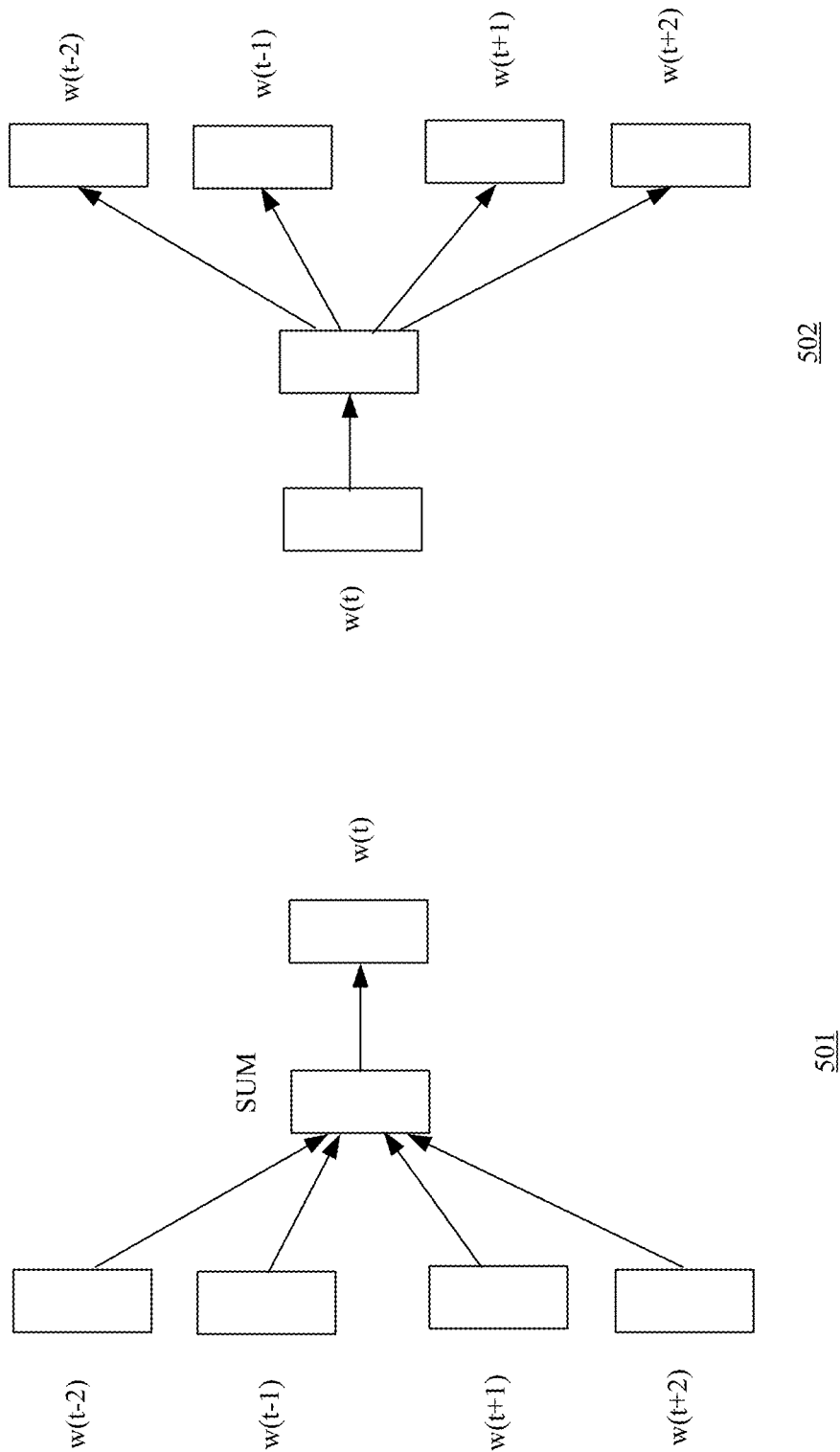
FIG. 5 depicts a continuous bag-of-words model and a continuous skip-gram model, in accordance with an example embodiment.

FIG. 5 depicts a continuous bag-of-words model and a continuous skip-gram model, in accordance with an example embodiment. In operation 301 above, the software generates a user-interest representation for a user which includes (1) pivot entities and (2) extended entities resulting from a nearest-neighbor search of word embeddings that might be derived from a large corpus of documents (e.g., Wikipedia articles rather than Wikipedia titles). In an example embodiment, the word embeddings might be distributional semantic embeddings derived from the corpus of documents using a continuous bag-of-words (CBOW) model or a continuous skip-gram model, using, for example, open-source software, such as word2vec at Google Code, which is based on Mikolov et al., "Efficient Estimation of Word Representations in Vector Space" (Sep. 7, 2013) (hereafter "Mikolov"). Both the documentation for word2vec and Mikolov are incorporated herein by reference.

Diagram 501 in FIG. 5 illustrates the CBOW model, where a word (e.g., w(t)) is projected from an input context that consists of the words that precede (e.g., w(t−1)) and follow (e.g., w(t+1)) the word. And diagram 502 in FIG. 5 illustrates the continuous skip-gram model, where the preceding (e.g., w(t−1)) and following contextual words (e.g., w(t+1) are projected from an input word (e.g., w(t)).

Figure 6:
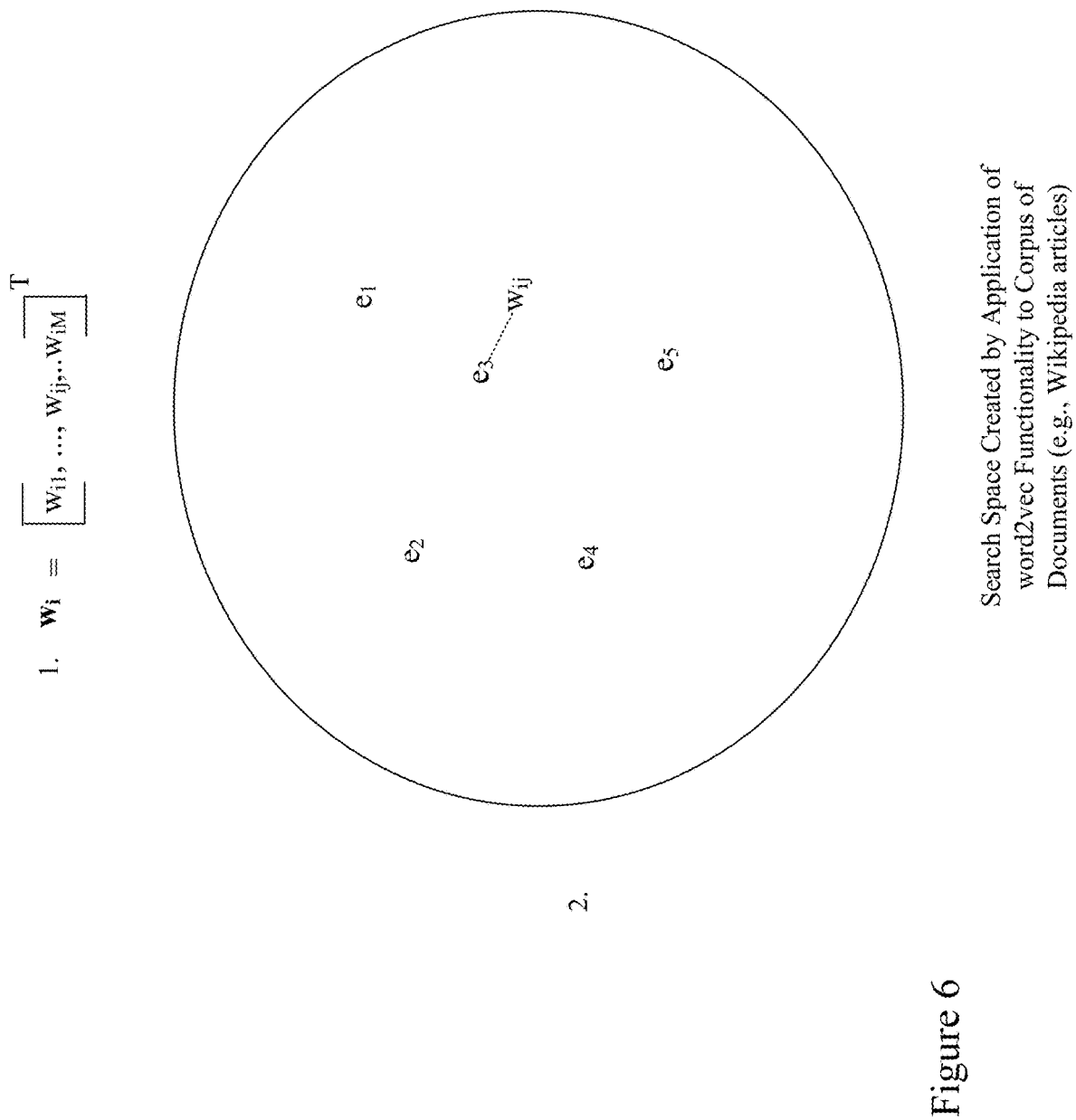
FIG. 6 depicts a search space created by application of word2vec functionality, in accordance with an example embodiment.

FIG. 6 depicts a search space created by application of word2vec functionality, in accordance with an example embodiment. As shown in this figure, an interest vector (1) for a user i includes a collection of entities identified as $w_i$ (e.g., enities 1, j, etc.), some of which are pivot entities (e.g., $w_{ij}$) as described above. Software for the content-aggregation service creates a search space (2) by applying word2vec functionality to a corpus of documents, e.g., Wikipedia articles, rather than titles of Wikipedia articles. The software then conducts a nearest-neighbor search of the search space to determine the nearest neighbors (e.g., $e_3$) of the pivot entities in $w_i$ (e.g., $w_{ij}$) and uses these nearest neighbors (e.g., $e_3$) as extended entities in the interest vector for the user, assigning a weighted value to each extended entity, based at least in part, on its nearness to a pivot entity, e.g., the most proximate pivot entity. In an example embodiment, the weighted value might be a normalized inverse of the distance to the most proximate pivot entity.

FIG. 7 shows a similarity calculation using an interest vector for a user and an entity vector for an article, in accordance with an example embodiment. As depicted in this figure, vector $w_i$ (1 in this figure) is an interest vector for a user, where the weighted values $w_{i1}$, $w_{ij}$, etc., are associated with entities 1, j, etc., which might include both pivot and extended entities. Vector $d_i$ (2 in this figure) is an entity vector, where the values $d_{i1}$, $d_{ij}$, etc. are document-aboutness scores for the entities 1, j, etc. The similarity (3 in this figure) between the interest vector and each entity vector representing an ingested article is the scalar resulting from the inner product of (1) and (2).

In an example embodiment, both the user-interest representation and the entity representation might be generated at run-time by combining the pivot entities with the extended entities. In an example scenario, an infrequent user might become a more frequent user over time. In that event, fewer extended entities might be used to build out the user-interest representation and the entity representation as time goes on and eventually no extended entities might be added.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising:
generating a first representation of interests for a user of a content-aggregation service, wherein the first representation includes a plurality of entities including pivot entities and extended entities, wherein the extended entities result from a nearest-neighbor search of word embeddings and wherein each of the extended entities is associated with a nearness score that is weighted using a distance of the extended entity from one of the pivot entities, wherein the pivot entities are labels derived from a corpus of documents;
receiving engagement signals, from the user, indicative of implied relevance feedback of the user with one or more articles, wherein the engagement signals comprise at least one of a click, a mouse-over, a dwell time or a skip;
determining an engagement score for each of the pivot entities based on the engagement signals;
combining one or more nearness scores associated with one or more extended entities of the extended entities with one or more engagement scores associated with one or more pivot entities of the pivot entities to generate one or more combined scores;
generating a second representation for each of a plurality of articles ingested by the content-aggregation service to generate second representations, wherein the generating of the second representation for each of the plurality of articles acts to associate an about score of each of the plurality of articles using each of the plurality of entities;
ranking the plurality of articles based on the one or more combined scores and the second representations;
receiving a request for access to the content-aggregation service from the user; and
serving the user a content stream based on the ranking, wherein at least some of the method is executed by one or more processors.

2. The method of claim 1, wherein the word embeddings are generated using word2vec functionality and the corpus of documents.

3. The method of claim 2, wherein the corpus of documents includes Wikipedia articles.

4. The method of claim 1, wherein both the first representation and the second representation are vectors and the ranking is based on a similarity measure, wherein the similarity measure is cosine similarity.

5. The method of claim 1, wherein the labels are nodes in a taxonomy created from documents previously ingested by the content-aggregation service.

6. The method of claim 1, wherein the ranking is based on a similarity measure.

7. The method of claim 1, comprising,
reducing a number of extended entities for generating the first representation as the user increases one or more engagement signals.

8. One or more non-transitory computer-readable media, being non-transitory and persistently storing a program, wherein the program, when executed, instructs a processor to perform operations comprising:
generate a first representation of interests for a user of a content-aggregation service, wherein the first representation includes a plurality of entities including pivot entities and extended entities, wherein the extended entities result from a nearest-neighbor search of word embeddings and wherein each of the extended entities is associated with a nearness score that is weighted using a distance of the extended entity from one of the pivot entities, wherein the pivot entities are labels derived from a corpus of documents;
receive engagement signals, from the user, indicative of implied relevance feedback of the user with one or more articles;
determine an engagement score for each of the pivot entities based on the engagement signals;
combine one or more nearness scores associated with one or more extended entities of the extended entities with one or more engagement scores associated with one or more pivot entities of the pivot entities to generate one or more combined scores;
generate a second representation for each of a plurality of articles ingested by the content-aggregation service to generate second representations, wherein the generating of the second representation for each of the plurality of articles acts to associate an about score of each of the plurality of articles using each of the plurality of entities;
ranking the plurality of articles based on the one or more combined scores and the second representations;
receive a request for access to the content-aggregation service from the user; and
serve the user a content stream based on the ranking.

9. The one or more non-transitory computer-readable media of claim 8, wherein the word embeddings are generated using word2vec functionality and the corpus of documents.

10. The one or more non-transitory computer-readable media of claim 9, wherein the corpus of documents includes Wikipedia articles.

11. The one or more non-transitory computer-readable media of claim 8, wherein both the first representation and the second representation are vectors and the ranking is based on a similarity measure, wherein the similarity measure is cosine similarity.

12. The one or more non-transitory computer-readable media of claim 8, wherein the labels are nodes in a taxonomy created from documents previously ingested by the content-aggregation service.

13. The one or more non-transitory computer-readable media of claim 8, wherein the nearest-neighbor search uses cosine similarity as a similarity measure.

14. The one or more non-transitory computer-readable media of claim 8, comprising,
reducing a number of extended entities for generating the first representation as the user increases one or more engagement signals.

15. A method, comprising:
generating a first representation of interests for a user of a content-aggregation service, wherein the first representation includes a plurality of entities including pivot entities and extended entities, wherein the extended entities result from a nearest-neighbor search of word embeddings, wherein the pivot entities are labels derived from a corpus of documents, wherein each of the pivot entities is associated with a value that is weighted using a sparse-polarity approach to be discriminative with respect to other entities, wherein each of the extended entities is associated with a nearness score that is weighted using a distance of the extended entity from a most proximate pivot entity associated with the extended entity;
receiving engagement signals, from the user, indicative of implied relevance feedback of the user with one or more articles, wherein the engagement signals comprise at least one of a click, a mouse-over, a dwell time or a skip;
determining an engagement score for each of the pivot entities based on the engagement signals;
combining one or more nearness scores associated with one or more extended entities of the extended entities with one or more engagement scores associated with one or more pivot entities of the pivot entities to generate one or more combined scores;
generating a second representation for each of a plurality of articles ingested by the content-aggregation service to generate second representations, wherein the generating of the second representation for each of the plurality of articles acts to associate an about score of each of the plurality of articles using each of the plurality of entities;
ranking the plurality of articles based on the one or more combined scores, a similarity measure and the second representations;
receiving a request for access to the content-aggregation service from the user; and
serving the user a content stream based on the ranking, wherein at least some of the method is executed by one or more processors.

16. The method of claim 15, wherein the nearest-neighbor search uses cosine similarity as at least one similarity measure.

17. The method of claim 15, wherein the word embeddings are generated using word2vec functionality and the corpus of documents.

18. The method of claim 17, wherein the corpus of documents includes encyclopedia articles.

19. The method of claim 15, wherein the labels are nodes in a taxonomy.

20. The method of claim 19, wherein the taxonomy is created from documents previously ingested by the content-aggregation service.

\* \* \* \* \*